United States Patent
Hesseln et al.

[11] Patent Number: 5,975,588
[45] Date of Patent: Nov. 2, 1999

[54] TURNABLE PIPE AND HOSE CONNECTIONS

[76] Inventors: Jörg Hesseln, Ostseestrasse 21, D-45665 Recklinghausen; Frank Hesseln, Unterstrasse 9a, D-45659 Recklinghausen, both of Germany

[21] Appl. No.: 09/144,412
[22] Filed: Sep. 2, 1998

[30] Foreign Application Priority Data

Sep. 6, 1997 [DE] Germany .......................... 197 39 175

[51] Int. Cl.[6] .................................................. F16L 27/047
[52] U.S. Cl. .............................. 285/89; 285/263; 285/906
[58] Field of Search .................................. 285/111, 261, 285/263, 89, 906

[56] References Cited

U.S. PATENT DOCUMENTS

| | | | |
|---|---|---|---|
| 1,001,117 | 8/1911 | Adreon | 285/89 X |
| 2,067,768 | 1/1937 | Krefft | 285/263 |
| 4,443,030 | 4/1984 | Hairston et al. | 285/263 |
| 5,127,681 | 7/1992 | Thelen et al. | 285/263 X |

FOREIGN PATENT DOCUMENTS

| | | | |
|---|---|---|---|
| 627093 | 1/1963 | Belgium | 285/261 |
| 520756 | 3/1931 | Germany | 285/261 |
| 509669 | 4/1957 | Italy | 285/261 |
| 67228 | 1/1951 | Netherlands | 285/111 |

*Primary Examiner*—Dave W. Arola
*Attorney, Agent, or Firm*—Herbert Dubno

[57] ABSTRACT

The turnable connections for pipes and hoses mainly consist of connection nipples which can be linked to the end of these connections and which are partly amable as well as equipped with at least one sealing ring and a connection nipple with a union nut, with the amable tap-type connection nipple showing two ball-shaped bulged sections with different radii but the same center as well as a union not corresponding with the ball-shaped section and the overall sleeve-type connection nipple having a thread on the outer surface, which as well has a corresponding ball-shaped section with the same center M. In order to achieve a better turnability of the connection in the operating condition with an improved sealing and contract retention, a circular gap (13) was integrated between the ball-shaped section (3) of the tap-type connection nipple (1) and the ball-shaped section (4) of the overall sleeve-type (2), and in the overall section (4) a circular recess with a supporting ring (14) and a sealing ring (6) was integrated, with the sealing ring (6) being located at the ascending part of the ball-shaped section (3) of the tap-type connection nipple (1).

5 Claims, 2 Drawing Sheets

TURNABLE PIPE AND HOSE CONNECTIONS

FIELD OF THE INVENTION

Our present invention relates to a swivelable connection for pipes and hoses which mainly consists of connection nipples which can be linked to the ends of hoses and which are partly swivelable as well as equipped with at least one sealing ring and a connection nipple with a union nut. The swivelable nipple has two ball-shaped bulged sections with different radii but the same center as well as a union nut corresponding with the ball-shaped section and the overall sleeve-type connection nipple having a thread on the outer surface, which as well has a corresponding ball-shaped section with the same center.

BACKGROUND OF THE INVENTION

In many technical areas, mainly in the installation technology, problems arise after the laying of pipes, especially in case of bends or non-lineal laying, if a swiveling of the pipes cannot be avoided due to e.g. external influences. A special example for such external influences on pipes which are usually laid in a straight manner, can be seen in underground mining, i.e. tube-type pressure pipes in the mining equipment. By moving the mining equipment forward from section to section, the pipe is turned in such a way that the connections become permanently leaky and damaged. A comparable problem arises in the case of smaller bending radii, especially high-pressure hoses, which are permanently leaky and damaged. A comparable problem arises in the case of smaller bending radii, especially high-pressure hoses, which are permanently moved or turned.

So called ball-headed connections are used and as they are described—among others in DE-OS 26 31 984 and in DE-AS 10 75 907.

The main disadvantage of such ball-head connections is, on the one hand, the limited angle which can be formed and, on the other hand, the fixing of the union nut which leads to a stiffening of the connection. The stiffening of such a connection finally results in the same problems for both pipes being moved by external influences and pipes laid in a straight and rigid manner. As not only the firmness of such connections is of great importance, but also the tensile strength—especially in case of higher pressures—and the connection does not create enough contact retention, their use is extremely limited, not only because of the lower swivelability and the rigidity.

Furthermore, there is a ball-shaped joint-connection in use, as is described in detail in DE-OS 16 50 030, which mainly aims at the special problems of sealing and movability under pressure. The potential solution might be that there are further internal surface-parts at the bell tap and at the ball pan and/or the pan nut of the floated medium parallel to the direction of flow, which mainly face the corresponding first internal surface parts.

Apart from the fact that such a ball-bead tube connection mainly requires great technical efforts in the single components, it is very complicated, large-volume and has the disadvantage that the flow medium causes enormous turbulences in each position of the connection. Due to design reasons, the sealing-off requires a variety of sealings with recesses and sealing-rings, which inevitably leads to the movement being impaired by stress.

OBJECT OF THE INVENTION

It is a principal object of the invention to create a swivelable and small-volume connection for pipes and hoses, which allows a better turnability than the former connections, without having a more negative impact on the flow in terms of swirling, and which does not become rigid in case of screwing and remains movable, which is—in a simple way—suited to damp piping movements and to balance them by permanent swivelability, which has a self-sealing effect that does not carry any disturbing impact and which can be assembled and disassembled as a connection without having additional tools and which, furthermore, can be used for pipes and hoses in all high-pressure areas due to its ability to absorb high contact retentions.

The task found its realization in the invention as the ball-shaped section of the overall sleeve-type connection nipple has a circular gap and the overall section has a circular recess with a supporting ring and a sealing ring, with the sealing ring being located at the ascending part of the ball-shaped section of the tap-type connection nipple.

The special advantage of the connection is that due to the forming of the circular gap in a so-called double-ball connection, a self-sealing effect is achieved without limiting the swivelability. The pressure medium can enter through the gap up to the sealing ring and presses the ring in the gap between the supporting ring and the tap-type section. The sealing ring, e.g. an O-ring, is made of a malleable and adjustable material, as for example rubber combined with plastic additions. The positioning of the sealing ring and the size of the supporting ring are of special importance as they help to tighten the remaining gap.

As the gap area in the direction of the pan-type section behind the center becomes larger due to the corresponding rounding-off, the sealing is located by the measurement L1 in front of the center M in a shifted manner, i.e. at that point where the gap shows its lowest cross-section. This way, the tap-type section is located in a floating manner without contact to the pan-type section, which leads to the fact that the bending will not be impacted by pressure.

In order to avoid greater turbulences of the flow medium in the bent condition, the corresponding tap- and pan-type sections show slopes shaped as conically expanding surfaces.

The design and location of the sealing enables an easy tightening and undoing of the connection by means of nipping and slacking—without having to use any tools.

The turnability of the connection requires that the corresponding ball-shaped sections show the same center with different radii.

The connections can be made of steel, plastics or a similar material, with the emphasis on the fact that the sections and surfaces meant to glide in case of turning are formed with low surface roughness. The surfaces can be hardened or hard-chromed to achieve a more favorable gliding behavior.

It is common that the supporting ring is shaped as a flat ring, in order to avoid a creeping of the seal. In line with the special design of this invention, the supporting ring is tapered on the side facing the sealing in the direction of the gap. The slope can be a straight or formed as a slightly convex-shaped wedge surface.

In the framework of the invention it is useful to add a stop or a counter-nut to the connection made by the screwed union nut in order to avoid an automatic undoing.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
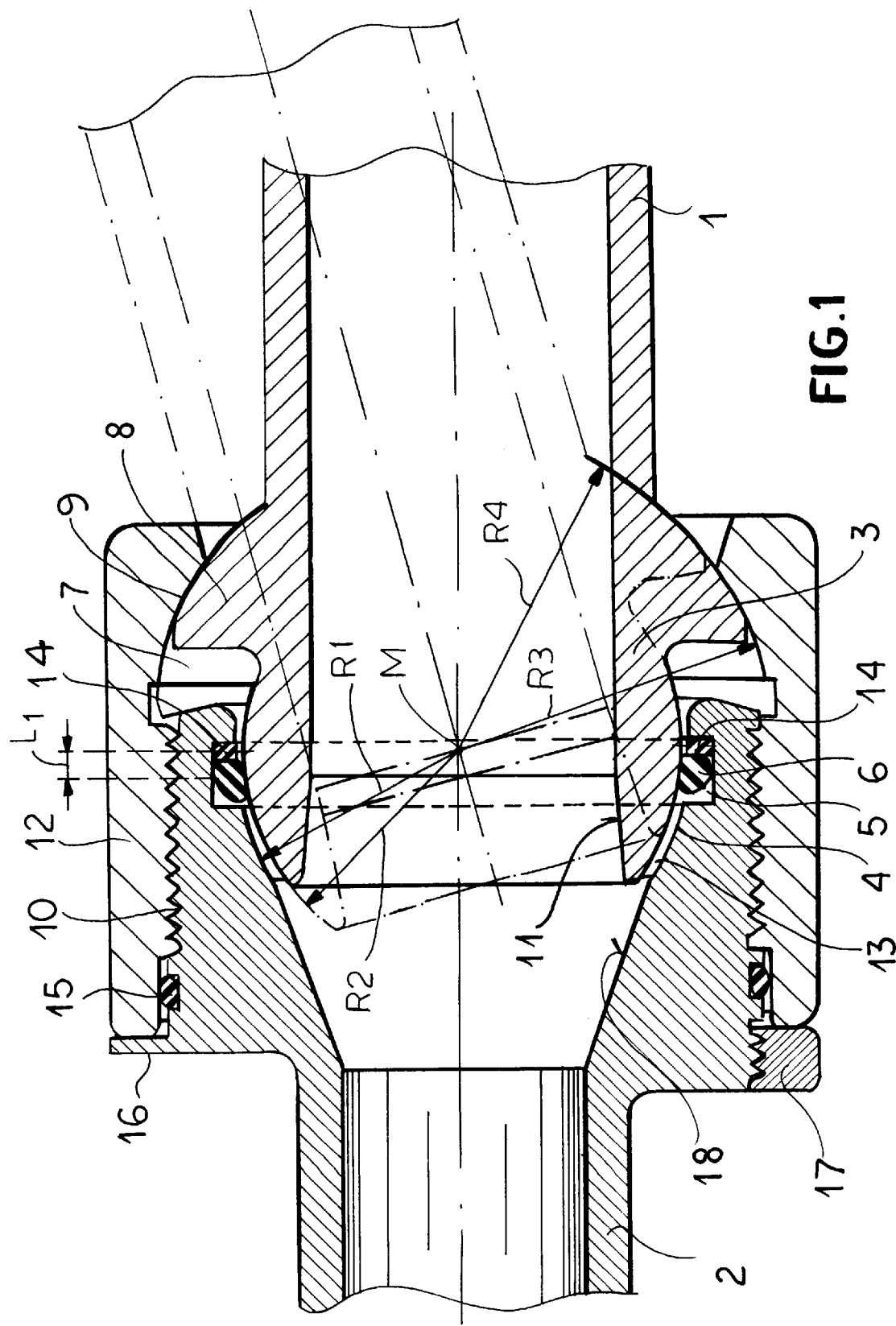
FIG. 1 is a cross sectional view of a connection according to the invention.

The embodiment shown in FIG. 1 has two connection nipples 1 and 2 forming a swivel connection. The pipes and hoses linked to the connection nipples 1 and 2 are not shown in this drawing.

The connection nipple 1 has a ball-shaped section 3 at the connection end of connection nipple 2. At some distance, connection nipple 1 is equipped with a further ball-shaped section or spherical collar 8. Both the ball-shaped section 3 as well as the ball-shaped section 8 show in the circular surfaces, which are circular-sectioned in the cross-section, and the different radii R2 and R4 a joint center M.

The distance between section 8 and the ball-shaped head 3 is so large that a circular ring groove 7 is available in case of a lineal connection of the connection nipples 1 and 2. The bent position of connection nipple 1 from connection nipple 2 is presented in broken lines.

The overall connection nipple 2 shows a bulged section 4 corresponding with the ball-shaped section 3. The union nut 12 as well shows a ball-shaped section cavity 9 corresponding with the ball-shaped section 8 or spherical collar. Also the ball-shaped sections 8 and 9 have in case of slightly different diameters R3 and R4 the same center M with the above described sections 3 and 4.

Within gap 1 between section 4 and section 3 there is a sealing ring 6 located in the circular recess. A further supporting ring 14 (flat ring) is located in recess 5, which penetrates gap 13 and thus reduces it to a certain extent.

The seal 6 sealing gap 13 (FIG. 2) by means of a pre-installation of the connection of the connection nipples 1 and 2 by a union unit 12, is positioned in front of the center M at a distance L1. In this area the gap 13 shows its lowest size to be measured in the cross-section. When stressing the connection by the pressure medium, the sealing 6 is pressed into the remaining gap and adjusts tightly by means of deformation. A further sealing can be installed between the gliding sections 8 and 9.

The sections 3 and 4 show cross-section expanding and conically expanding passages 11 and 18 in the direction of the mouth of Section 3 in order to avoid swirls.

The union nut 12 which can be fixed and undone without additional tools due to the pre-installation of sealing 6, can be screwed against stop 16 or a counter-nut without any compelling preconditions. Furthermore, it is useful to install a further seal 15 between the connection nipple 2 and the union nut 12.

Figure 2:
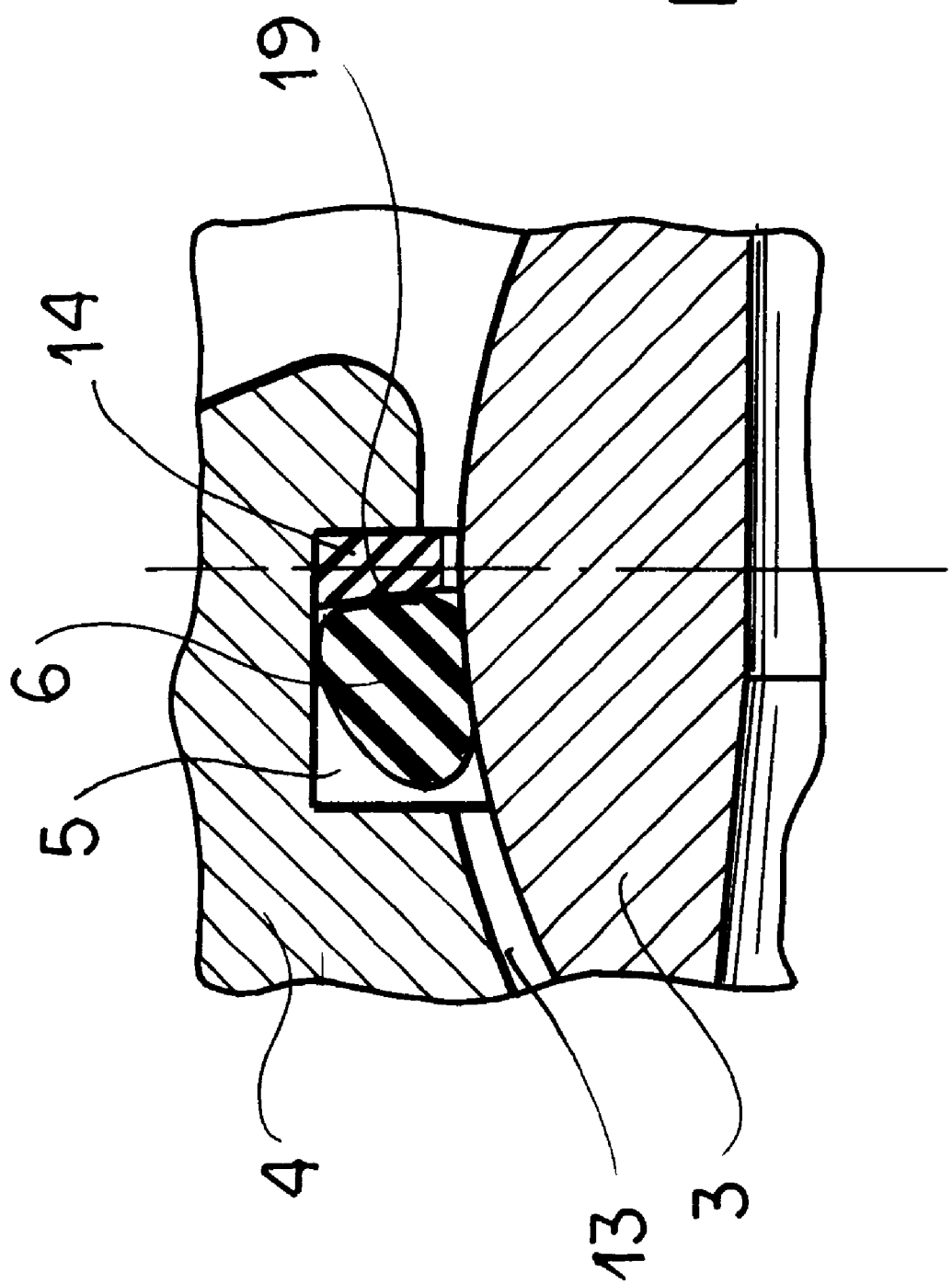
FIG. 2 is a detail of the seal combined with the supporting ring.

As shown in FIG. 2, the supporting ring 14 (usually in the form of a flat ring) is shaped in a sloped manner facing the side of sealing 6, in order to force sealing ring 6 in a wedge form or e.g. a slightly convex slope into its sealing position.

We claim:

1. A swivelable pipe connection comprising:

a first nipple formed at a connection end with a ball-shaped formation surrounding a mouth of said first nipple and a spherical collar spaced axially from said ball-shaped formation, said ball-shaped formation and said spherical collar having the same center of curvature, said spherical collar having a spherical surface of a greater radius of curvature than a spherical surface of said ball-shaped formation;

a second nipple formed with a ball-shaped socket swivelably receiving said ball-shaped formation and defining an annular gap therewith, said second nipple being formed with an internal annular groove juxtaposed with said ball-shaped formation across said gap;

a circular sealing ring in said groove bridging said gap and bearing against said ball-shaped formation for sealing thereagainst, said sealing ring being located at an increasing-diameter portion of said ball-shaped formation; and a union nut surrounding said first nipple, threaded onto said second nipple and having a ball-shaped cavity receiving said spherical collar, said first nipple having a conical flow cross section widening toward said mouth and said second nipple having a conical flow cross section in the region of said mouth and widening toward said socket.

2. The swivelable pipe connection defined in claim 1, further comprising a support in said groove behind said sealing ring and extending partially into said gap.

3. The swivelable pipe connection defined in claim 1, further comprising a stop formed on said nipple and engageable by said nut.

4. The swivelable pipe connection defined in claim 1, further comprising a counter nut threaded onto said second nipple and engaging said union nut.

5. The swivelable pipe connection defined in claim 1, further comprising another seal between said nut and said second nipple.

* * * * *